United States Patent
Schilling et al.

(10) Patent No.: US 7,935,900 B2
(45) Date of Patent: May 3, 2011

(54) WEIGHING DEVICE

(75) Inventors: Peter Schilling, Siebnen (CH); Andreas Metzger, Männedorf (CH); Hans-Rudolf Burkhard, Wila (CH); Thomas Koeppel, Oetwil am See (CH); Jean-Christophe Emery, Zürich (CH)

(73) Assignee: Mettler-Toldeo AG, Greifensee (CH)

( * ) Notice: Subject to any disclaimer, the term of this patent is extended or adjusted under 35 U.S.C. 154(b) by 350 days.

(21) Appl. No.: 12/301,187

(22) PCT Filed: Aug. 31, 2007

(86) PCT No.: PCT/EP2007/059121
§ 371 (c)(1),
(2), (4) Date: Dec. 18, 2008

(87) PCT Pub. No.: WO2008/028869
PCT Pub. Date: Mar. 13, 2008

(65) Prior Publication Data
US 2009/0308665 A1 Dec. 17, 2009

(30) Foreign Application Priority Data
Sep. 6, 2006 (EP) .................................... 06120184

(51) Int. Cl.
*G01G 21/28* (2006.01)
(52) U.S. Cl. ...................................... 177/126; 177/238
(58) Field of Classification Search .................. 177/126, 177/127, 238
See application file for complete search history.

(56) References Cited

U.S. PATENT DOCUMENTS

| | | | | |
|---|---|---|---|---|
| 4,043,413 A | * | 8/1977 | Schaenen | 177/126 |
| 4,099,587 A | | 7/1978 | Kaufmann | |
| 4,280,577 A | | 7/1981 | Kunz | |
| 4,986,376 A | * | 1/1991 | Cone | 177/128 |
| 5,033,562 A | * | 7/1991 | Cone | 177/128 |
| 5,228,570 A | * | 7/1993 | Robinson | 206/378 |
| 5,379,923 A | * | 1/1995 | Sagastegui et al. | 222/181.2 |
| 6,036,400 A | * | 3/2000 | Clark | 404/9 |
| 6,615,638 B1 | | 9/2003 | Lochner et al. | |
| 7,060,914 B2 | * | 6/2006 | Suzuki | 177/238 |
| 7,208,688 B2 | * | 4/2007 | Jauert et al. | 177/238 |
| 7,235,746 B2 | * | 6/2007 | Williamson | 177/126 |
| 2006/0207804 A1 | | 9/2006 | Schilling et al. | |
| 2007/0034418 A1 | | 2/2007 | Kuhlmann et al. | |

FOREIGN PATENT DOCUMENTS

| | | |
|---|---|---|
| DE | 202005015932 U1 | 1/2006 |
| WO | 2007/041979 A1 | 4/2007 |

* cited by examiner

*Primary Examiner* — Randy W Gibson
(74) *Attorney, Agent, or Firm* — Standley Law Group LLP

(57) ABSTRACT

Weighing device with at least one weighing cell and with a receiving structure serving to hold the at least one weighing cell, wherein the at least one weighing cell includes a first fastener device serving to fasten the weighing cell in the receiving structure, and the receiving structure includes a second fastener device which is a complementary counterpart of said first fastener device. The fastener devices include a detent engagement mechanism and are designed in such a way that they hold as well as release the weighing cell by means of a form-locking engagement which can be locked and released, respectively, by a simple action in the form of pushing in the direction of the load and pulling against the direction of the load.

16 Claims, 6 Drawing Sheets

WEIGHING DEVICE

TECHNICAL FIELD

The invention concerns an arrangement for fastening a weighing cell or a plurality of weighing cells in a weighing device.

BACKGROUND OF THE ART

A weighing device of the generic type addressed by the invention, for example a device for weighing objects of a uniform kind, finds application primarily in automated production—and test systems, where scales of a modular design, so-called weighing modules are particularly well suited for incorporation in such systems. Frequently, the weighing modules employed here, which are also often referred to as weighing cells, are of a type where the indicator unit is arranged in separation from the weighing module or weighing cell, as is the case for example in a system with a central indicator for a plurality of such weighing modules or weighing cells. Areas of application for integrated weighing modules of this kind are installations for the production and/or testing of small, relatively expensive parts, for example in filling—and packaging machines for tablets, capsules ampoules, etc., in the pharmaceutical industry, or for the checking of ball bearings. The weighing of uniform objects and also the so-called batch weighing are processes where multiple loads have to be weighed individually in a confined space for a diversity of purposes such as checking, dispensing measured doses, and/or fill-weighing.

Systems of this kind which serve to weigh uniform objects belong to the known state of the art. The prevalent types are linear arrays of weighing cells. Other arrangements are based on a concept of spreading the weighing cells out in a two-dimensional layout like satellites associated with a linear array of load receivers, wherein the latter have to match the spacing of the conveyor elements of an existing conveyor system, as the individual weighing modules or weighing cells are in many cases too large to be lined up at the required small intervals.

In a weighing cell which operates according to the principle of electromagnetic force compensation, the force generated by a load on the weighing pan is compensated by a force-compensating member consisting of a permanent magnet and a coil, wherein the current is measured which flows through the coil and generates the compensating force. This measurement value is in proportion to the weighing load. However, this measurement value is also dependent on the position of the coil in the magnetic field of the permanent magnet, which is why the coil always has to be in the same position relative to the magnet at the moment when the measurement value is captured. The position of the coil after applying a load is determined by a position sensor, and the current through the coil is increased until the displacement of the coil which was caused by the load is compensated. Now the coil current is measured which is representative of the weight of the applied load. A weighing cell of this kind is disclosed in U.S. Pat. No. 4,280,577, wherein the weighing cell includes between the load receiver and the force-compensating member a force-transmitting mechanism whereby the force generated by the load on the load receiver is transmitted to the force-compensating member, either reduced or amplified in magnitude depending on the load range.

A weighing cell operating according to the same principle is disclosed in U.S. Pat. No. 4,099,587. In this patent, the load receiver is coupled directly to the force-compensating member through a force-transmitting rod. Attached to the force-transmitting rod is the movable portion of the position sensor, while the stationary part of the position sensor is rigidly connected to the housing-mounted part of the weighing cell, specifically to the part of the force-compensating member that has a fixed position relative to the housing. This arrangement, which is referred to as the direct-measurement principle, is used with preference in the range of small weighing loads.

A weighing cell that is designed for installation in a receiving holder arrangement is described in WO 2007/041979 A1. In order to establish a releasable mechanical and electrical connection with an associated receiving holder arrangement of an appropriate complementary design, the weighing cell has alignment elements which are designed to cooperate with alignment elements of the receiving holder arrangement. The receiving holder arrangement is intended for permanent installation in a machine that is designed to perform weighing functions.

In cases where it is important to quickly measure the individual masses of weighing objects, it suggests itself for example to use a setup of several weighing cells to allow the individual masses such as weighing objects of a uniform kind to be weighed in parallel. A need exists in particular for weighing systems that are suitable for use in the area of mass determination in the range of milligrams to grams. In the case of weighing cells whose dimensions are large in comparison to the spacing between the conveyor elements of a conveyor system, and with the use of a complex conveyor system, in particular of a kind where the conveyor elements are set up in a two-dimensional arrangement, even a star-shaped arrangement as disclosed in the prior art will not meet the requirements. As the dimensions of the weighing cells, length as well as width, are often larger than the required spacing between the central longitudinal axes of their load receivers, only a limited number of weighing cells can be placed around an area provided for the arrangement of the load receivers which is determined by the conveyor elements of the conveyor system.

SUMMARY

It is therefore the object of the invention to provide a weighing cell which can be arranged in a system in a way that requires little space. The aim is for example to provide an arrangement of load receivers, and thus an arrangement of weighing cells that are connected to the load receivers, which is adapted to a complex conveyor system for weighing objects in which the conveyor elements are spaced apart at narrow intervals. It is a requirement that each weighing cell can be installed in this arrangement and removed from it in a simple manner.

This task is solved by a weighing device with at least one weighing cell and with a receiving structure that serves to hold at least one weighing cell. The at least one weighing cell has a first fastener device which serves to secure the weighing cell in the receiving structure, while the receiving structure has a second fastener device which is the complementary counterpart of the first fastener device.

To allow a simple installation of a weighing cell in the receiving structure and a correspondingly simple separation of the weighing cell from the receiving structure, the fastener devices include a detent engagement mechanism and are configured in such a way that they hold and release the weighing cell by means of a form-locking engagement which can be locked and unlocked by simple operator action directed at the weighing cell. In particular, the action is applied to the weighing cell directly and without intermediary means, specifically in the form of pushing in the direction of the load and pulling against the direction of the load.

In a weighing device with a receiving structure serving to hold a plurality of weighing cells, the at least one weighing cell is arranged in the receiving structure in a design space whose dimensions in a plane running perpendicular to the load direction match the largest dimension of the weighing cell in the same plane, and which is delimited by the design spaces reserved for neighboring weighing cells that are to be arranged in the receiving structure. The weighing device can thus be adapted to a conveyor device for weighing objects in which the conveyor elements are spaced at narrow intervals.

A weighing cell, as the term is used in the present context, means a device that serves to measure the force of a load, in particular a load that is placed on a load receiver connected to the weighing cell, wherein the presence of electronic components for the evaluation of the electrical measurement signal is however not necessarily required.

As the weighing cells are preferably of a uniform design, they are individually interchangeable. This makes a weighing device of this type more service-friendly.

The weighing device is thus distinguished by a high level of compactness, and by making it possible to weigh for example small, relatively expensive products in parallel, it ensures a fast weighing process and thus a high throughput of weighing objects.

The receiving structure is configured in a special way so that it can accommodate a plurality of weighing cells in a two-dimensional area or matrix structure. A design space in the aforementioned plane thus matches the largest dimension of the weighing cell in said plane. This has the consequence that each of the load receivers can be arranged in the proximity of the weighing cell to which it belongs.

The dimension of the design space in the direction of the load is delimited above and below the weighing cell only by adjacent systems, for example by the operating space of a conveyor system or for example by a housing wall of the weighing device. In one embodiment where the weighing cells are arranged on several levels, a neighboring level of the weighing device can delimit the design spaces for the weighing cells below it.

The receiving structure can for example have a base plate on which the second fastener device is arranged. The second fastener device can work together with a first fastener device that is arranged at the underside of the weighing cell. In this case, the weighing cell is fastened to and separated from the receiving structure preferably from above.

As a further embodiment, the receiving structure has a fastening plate in which the at least one weighing cell can be installed, and the second fastener device is incorporated in the fastening plate. In this case, the weighing cell can be fastened to and separated from the receiving structure either from above or below, depending on the specific design of the fastener device.

The cooperating fastener devices establish a mechanical and preferably also an electrical connection between the at least one weighing cell and the receiving structure, so that the weighing cell can be anchored safely in the receiving structure and released again in a simple manner, while the weighing cell is at the same time supplied with power and can send and/or receive electrical signals through this connection.

The weighing cell in a preferred embodiment has a housing on which the first fastener device is arranged.

In order to make the process of connecting and/or separating the weighing cell and the receiving structure safe and simple, the first and/or the second fastener device has a guide feature which indicates how the weighing cell is to be connected to the receiving structure. The guide feature can also be designed so as to make it impossible to connect the fastener elements the wrong way. A guide feature is also possible which positions and guides the elements that cooperate in the fastening attachment, thus facilitating the connecting process. The guide features can have the form of a simple guide mark and/or of a pin cooperating with a groove and/or a seating recess.

A detent mechanism or snap mechanism can be realized through a concept where the first fastener device has at least one groove or recess and the second fastener device has at least two, and in particular three, balls which are seated against spring elements in such a way that when the weighing cell is set into the receiving structure, the balls will snap into the at least one groove or recess.

In a further embodiment, the first fastener device has at least two passage holes and the second fastener device has at least two spreader pins arranged diagonally across from each other, wherein when the weighing cell is set into the receiving structure, the spreader pins snap into engagement with the holes and thereby ensure a safe connection between the weighing cell and the receiving structure.

In a preferred embodiment, the mechanical attachment and the electrical connection are spatially separated from each other in the receiving structure. This separation is very advantageous, because the electrical connecting lines can thus be screened in a simple way against electromagnetic interference. As a further consequence of the separation, and with an appropriate design configuration, mechanical stress on the electrical connections is avoided or minimized.

To identify each individual weighing cell in a weighing device and also to determine the reproducibility of the weighing results, it may be advisable to provide each weighing cell with a unique identification code. This code can then be picked up by a suitable counterpart which is arranged on the receiving structure. Among other possibilities, the code can consist of a bar code, a matrix code or a passive element of an RFID system. In particular, it is also conceivable that there is a memory chip on which relevant data of the weighing cell are stored.

For the weighing of uniform weighing objects, it suggests itself in particular to configure a weighing device with a specified number of weighing cells and an equal number of load receivers. This number may be based primarily on the number of conveyor elements of a conveyor system.

BRIEF DESCRIPTION OF THE DRAWINGS

In the following, the invention is described through examples which are illustrated schematically in the drawings, wherein.

DETAILED DESCRIPTION

Figure 1:
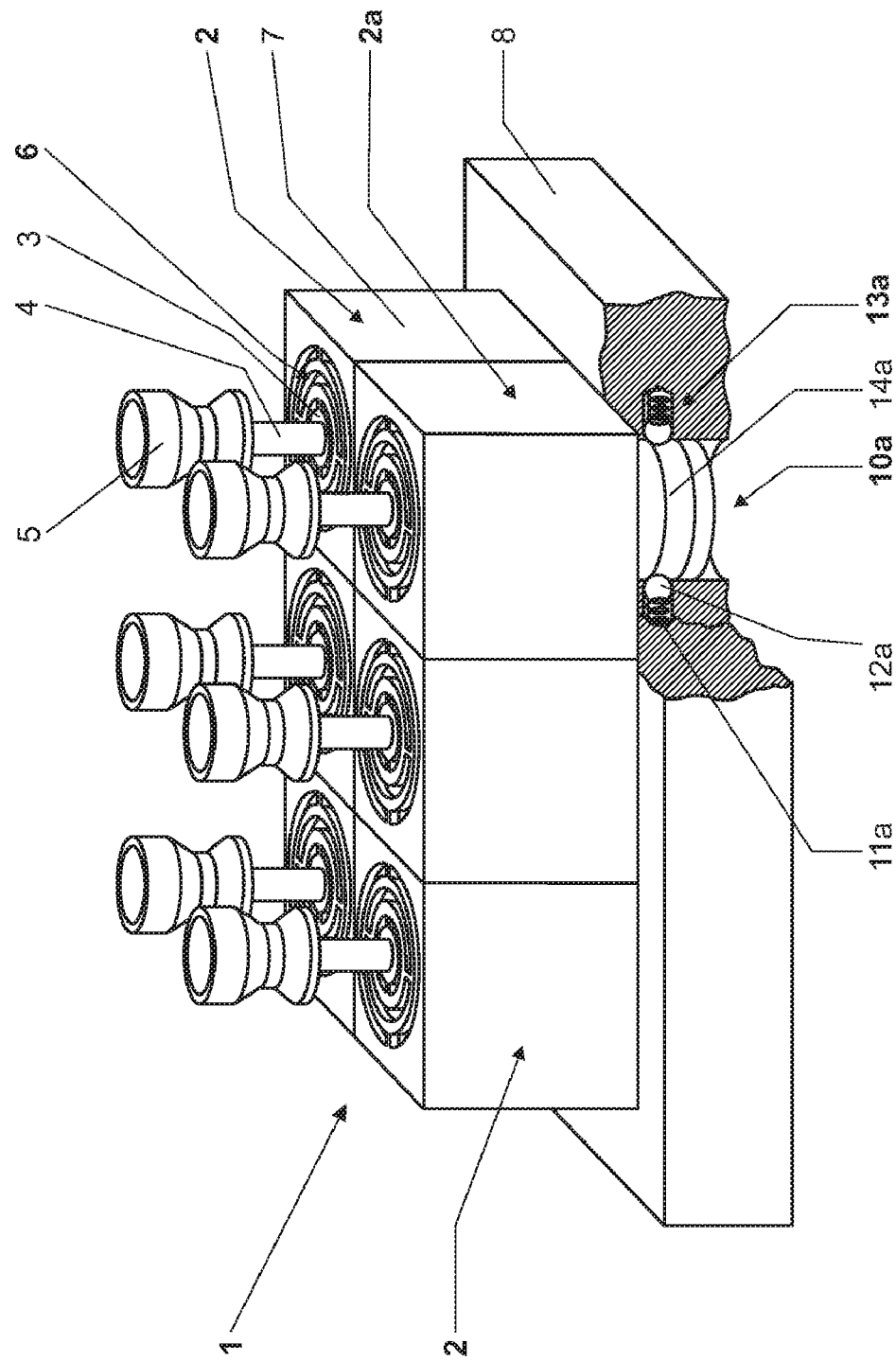
FIG. 1 represents a perspective view of a weighing device with six weighing cells which are arranged in a two-dimensional matrix and are equipped with a first embodiment of fastener devices for securing each weighing cell in a receiving structure.

FIG. 1 shows in a perspective view a weighing device 1 with six weighing cells 2 which are arranged in a two-dimensional matrix. Each of the weighing cells 2 contains in its interior a built-in arrangement of a coil and a magnet (not shown here) that is connected to the load-receiving area 3. From each of the load-receiving areas 3, a force-transmitting rod 4 extends in the opposite direction of the load direction, carrying at its end a load receiver 5. Above the load-receivers 5 is normally the operating space of a conveyor system which is not illustrated here. Each of the load-receiving areas 3 of a weighing cell 2 is part of a parallel-guiding mechanism which, when a load is applied, is movable in the direction of the latter. Parts of the parallel-guiding mechanism that are shown for each weighing cell 2 in the drawing are the load-receiving area 3, the upper parallel guide 6, and the stationary part 7 of the weighing cell 2.

Each weighing cell 2 is fastened to a receiving structure in the form of a base plate 8. For the weighing cell 2a which is shown to the right in the foreground of FIG. 1, the break-away portion of the base plate 8 opens up the view into a first embodiment of fastener devices for securing the weighing cell 2a on the base plate 8. The fastener devices include a second fastener device 13a which is incorporated directly in the base plate. The second fastener device has at least two—but preferably three or four—balls 12a, each of which is seated on a spring 11a. When the weighing cell 2a is in its connected state with the base plate 8, the balls 12a engage or snap into a perimeter groove 14a of a first fastener device 13a which is connected to the weighing cell 2a. As a result, the weighing cell 2a is releasably connected to the base plate 8 and can be exchanged against another weighing cell of the same kind, if necessary, for example in a service case or if the weighing device 1 needs to be adapted for another load range.

For interchangeability, all of the other weighing cells 2 that are shown in FIG. 1 are of course equipped with identical fastener devices. To ensure a secure engagement, the respective axes of the balls 12a and of the groove 14a are slightly offset against each other in the vertical direction, so that when the weighing cell is set in place, there is a contact force acting on the balls which pulls them into the groove.

Figure 2:
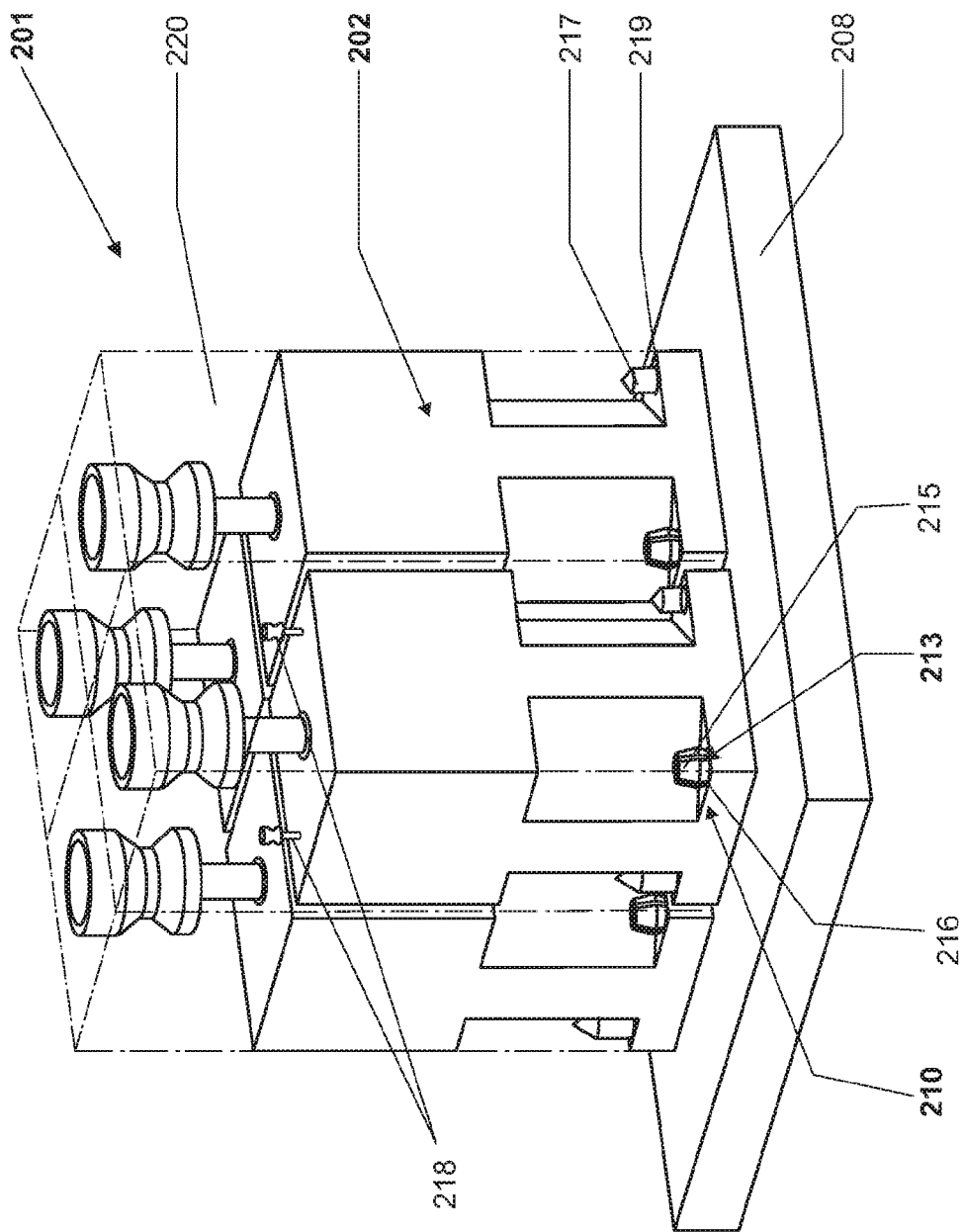
FIG. 2 represents a perspective view of a weighing device with four weighing cells which are arranged in a two-dimensional matrix and are equipped with a second embodiment of fastener devices for securing each weighing cell in a receiving structure.

Likewise in a perspective representation, FIG. 2 shows a further embodiment of a weighing device 201 with four weighing cells 202 which are arranged in a two-dimensional matrix. Each weighing cell 202 is arranged within a design space 220 which is indicated in the drawing by dash-dotted lines and whose dimensions measured in a plane orthogonal to the load direction are delimited by the design spaces 220 of neighboring weighing cells 202 that are arranged in the receiving structure. The receiving structure in this example essentially comprises a base plate 208. Working together with the base plate 208, the weighing cells 202 include a second embodiment of fastener devices serving to secure each weighing cell 202 in the receiving structure, i.e. in the base plate 208 in the present example. The fastener devices are made up of a second fastener device 213 which has two spreader pins 215 that are arranged diagonally on the base plate 208 and engaged in a first fastener device 213, the latter being incorporated in the weighing cell 202 which has holes 216 arranged diagonally opposite each other. After passing through the holes 216, the spreader pins lock the weighing cell 202 against separating itself from the base plate 208 and only release their hold on the weighing cell 202 if a large enough pulling force is applied to the latter. Also shown in FIG. 2 are guide bolts 217 which are likewise fastened to the base plate 208 and are engaged in further holes 219 of the weighing cell 202 to exactly position the latter on the base plate 208. A weighing cell 202 is preferably equipped with two posts 218 providing a grip for pulling the weighing cell out of the receiving structure, for example with a tool.

Figure 3:
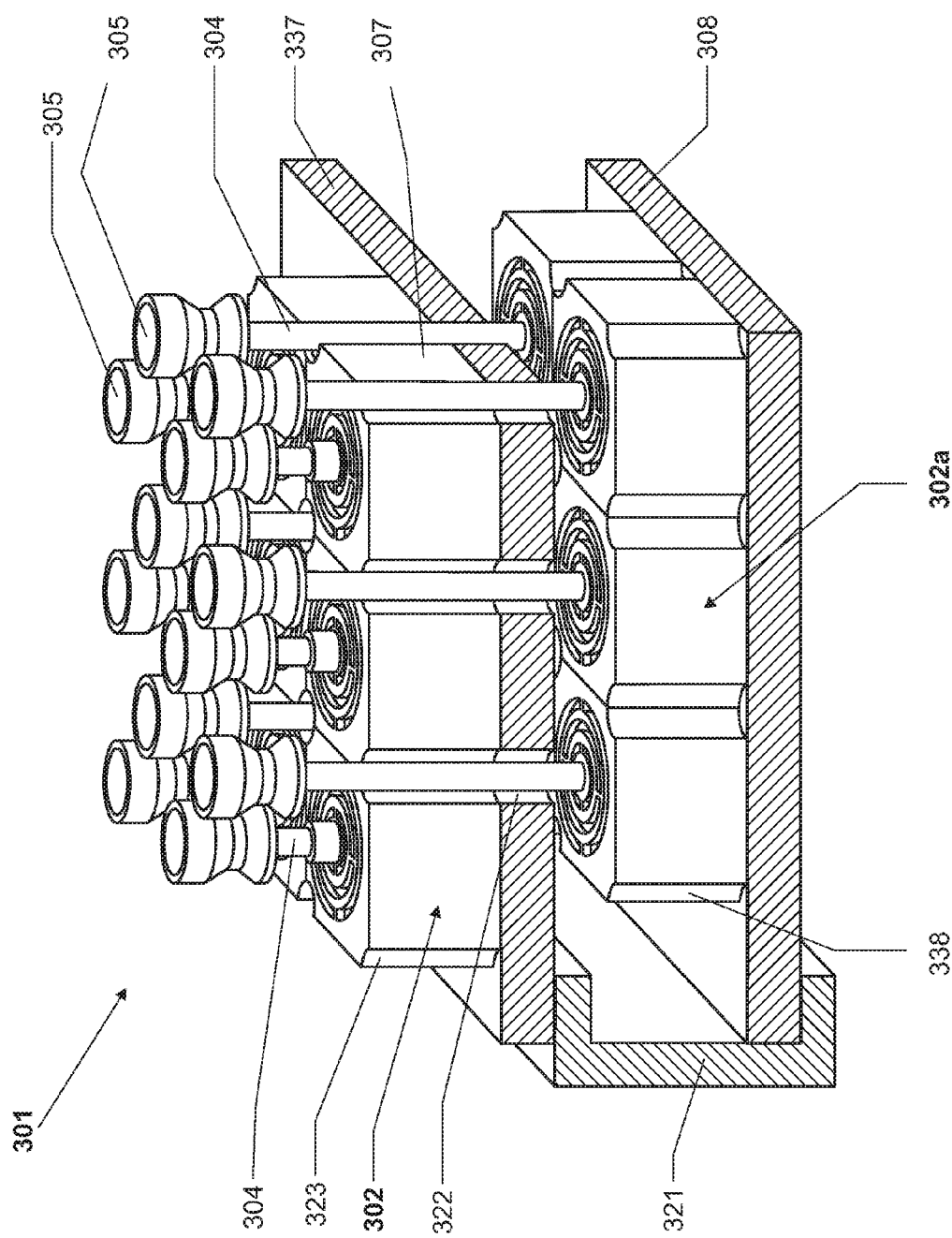
FIG. 3 represents a perspective view of a weighing device with a plurality of weighing cells which are set up in two-dimensional matrix arrangements, wherein the receiving structure is designed to accommodate weighing cells simultaneously on several levels.

FIG. 3 shows in a perspective view a weighing device 301 with several weighing cells 302, 302a which are arranged in a two-dimensional matrix layout. For a description of the structure of the weighing cells 302, 302a, the reader is referred to the description of FIGS. 1 and 2. The weighing device 301 has two base plates 308, 337 arranged parallel to each other, spaced apart from each other in the direction of the load, and rigidly connected to each other through at least one vertically oriented connecting element 321. The connecting element 321 can for example be configured as an essentially closed frame which covers the gap between the two base plates 308, 337 against the outside, or it could also be configured as a box in which the base plates 308, 337 are installed. The lower base plate 308, as part of a receiving structure, essentially corresponds to one of the base plates 8, 208 illustrated in FIG. 1 or 2. The upper base plate 337, as a further part of the receiving structure, additionally includes passages 322. Continuations of these passages 322 are formed along the meeting corners of the design spaces through cutbacks 323 in the vertical edges of the weighing cells 302. The passages 322 as well as the cutbacks 323 along the edges of the stationary parts 307 of the weighing cells 302 serve as passage ways for the force-transmitting rods 304 of the weighing cells 302a which are arranged on the lower base plate 308. The lower base plate 308 can accommodate weighing cells without cutbacks as well as the weighing cells 302a with cutbacks that are shown here. By arranging the weighing cells 302, 302a on two different base plates 308, 337 aligned parallel to each other, it is possible to accommodate essentially twice the number of weighing cells 302, 302a on the same footprint area. The weighing mechanism of the weighing cells 302, 302a is the same as in the weighing cells which have already been described in the context of FIGS. 1 and 2. It is considered self-evident that for example the load receivers 305 as well as the upper base plate 337 with the weighing cells 302 arranged on it can easily be removed as a whole in order to allow individual weighing cells 302a on the base plate 308 to be exchanged if necessary.

As is evident from FIG. 3 and consistent with the force-transmitting rods 304 reaching through the passages 322 and the cutbacks 323, the weighing cells 302a on the lower base plate 308 are offset from the weighing cells 302 of the upper base plate 337 by half the length and half the width of their respective design spaces.

Figure 5:
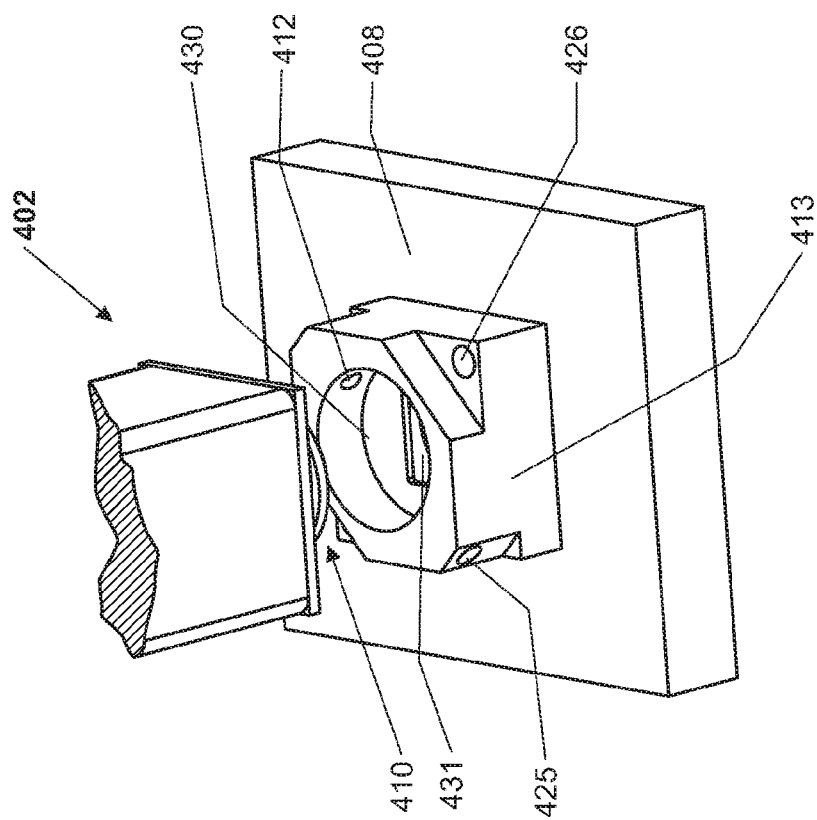
FIG. 5 represents the weighing cell of FIG. 4 in a different perspective view, wherein the element for the coupling connection is shown in its connected state with the receiving structure.
Figure 4:
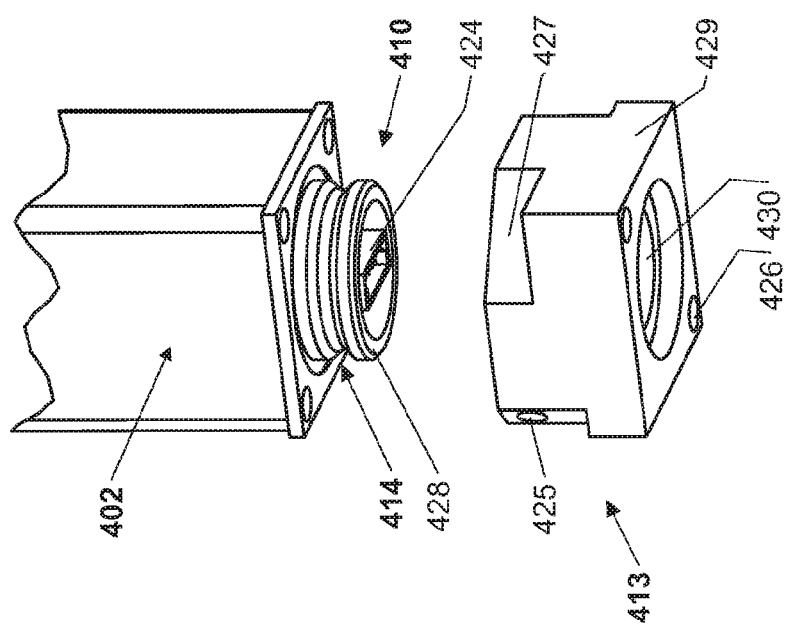
FIG. 4 represents a perspective view of a detail of a weighing cell with a further embodiment of fastener devices, wherein a fastener device includes an element for a coupling connection to a receiving structure.

FIGS. 4 and 5 each show a detail of a first embodiment of fastener devices for a weighing cell seen from two different perspectives, wherein identical elements are shown with the same reference symbols. On the weighing cell 402 a first fastener device 410 is arranged which extends perpendicular to the load direction. The first fastener device 410 is configured as a cylindrical sleeve 428 with a circumferential groove 414. Arranged inside the sleeve 428 is an electrical connector plug 424 through which the weighing cell can exchange electrical signals and/or receive its power supply. The second fastener device 413, which works together with the first fastener device 410 so that the weighing cell can snap into a receiving structure, is shown here in the form of a socket 429 with a circular-shaped seating recess 430 oriented parallel to the direction of the load. The internal diameter of the circular-shaped seating recess 430 essentially matches the external diameter of the cylindrical sleeve 428. The socket 429 further has at least two holes 426 directed parallel to the direction of the load, which serve to couple the second fastener device 413 to a base plate (not shown in FIG. 4) represented in FIG. 5 as base plate 408. The holes 426 are arranged opposite each other at an angle of 180° in relation to the circular-shaped seating recess 430. As shown in FIG. 4, the socket 429 has a setback 427 above each of the vertical holes 426. Relative to the circular-shaped seating recess 430, two passage holes 425 which are oriented perpendicular to the load direction are arranged at locations between the holes 426. These passage holes 425 serve for the arrangement of the balls 412 and springs illustrated in FIG. 1, which in the installed state of the weighing cell are pushed against the groove 414, so that the weighing cells 402 snap into the socket 429.

FIG. 5 shows the second fastener device 413 arranged on a base plate 408. Also visible inside the circular-shaped seating recess 430 is the connector socket 431 for the electrical connector plug 424.

Figure 6:
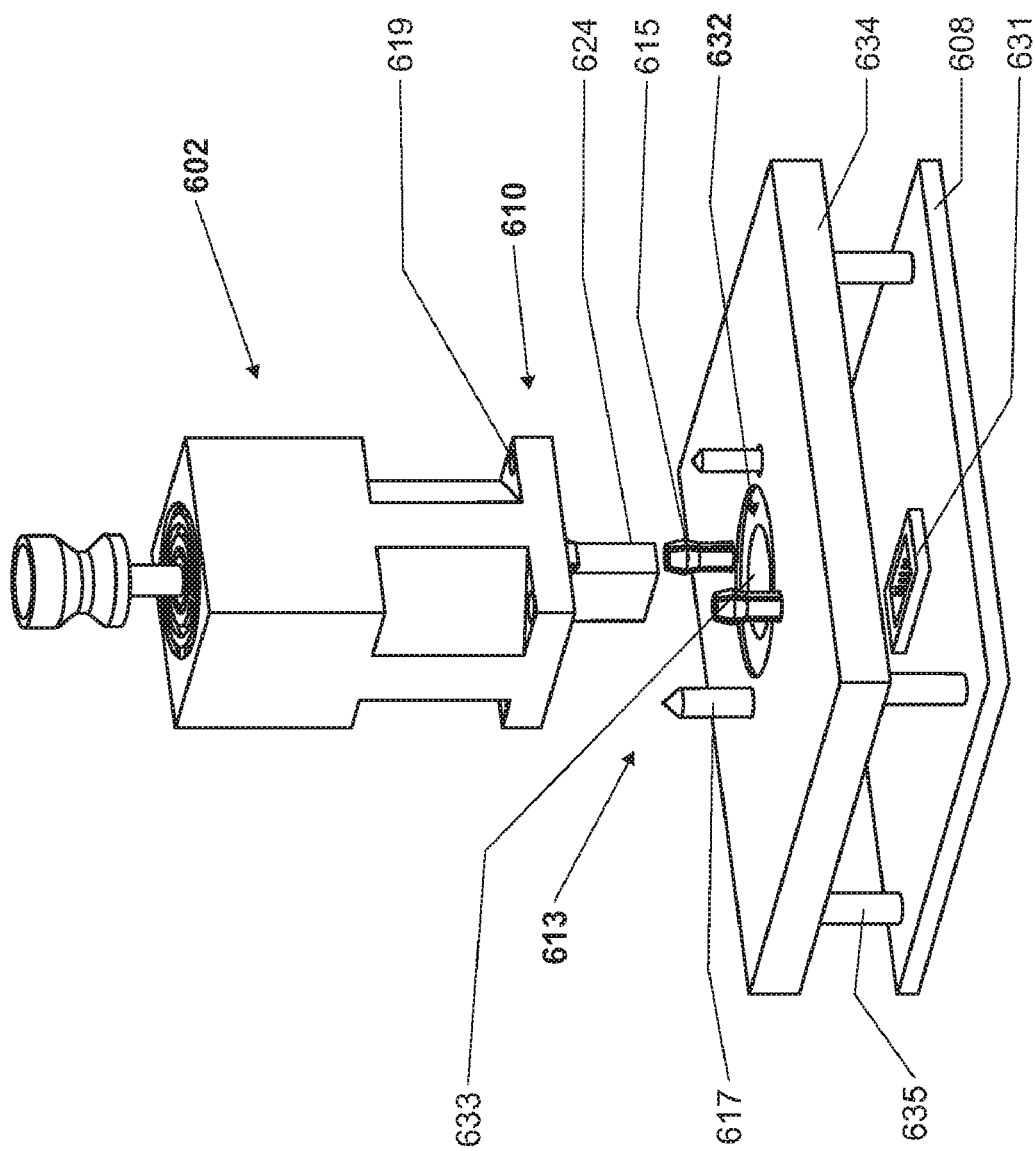
FIG. 6 represents a perspective view of a weighing cell with a second embodiment of fastener devices for securing the weighing cell in a receiving structure, wherein the electrical connection and the mechanical connection lie in different planes.

FIG. 6 shows a further embodiment of fastener devices in a perspective view, wherein a weighing cell 602 is coupled to a fastening plate 634. Arranged on the fastening plate 634 is a second fastener device 613 with two spreader pins 615 arranged diagonally on the fastening plate 634, which are inserted in a first fastener device 610, the latter being incorporated in the weighing cell 602, which has holes 616 arranged diagonally opposite each other. After passing through the holes 616, the spreader pins 615 lock the weighing cell 602 against separating itself from the fastening plate 634 and only release their hold on the weighing cell 602 if a large enough pulling force is applied to the latter. Also shown in FIG. 6 are guide bolts 617 which are likewise fastened to the fastening plate 634 and are engaged in further holes 619 of the weighing cell 602 to exactly position the latter on the fastening plate 634. Visible between the guide bolts 617 and the spreader pins 615 is a circular-shaped recess 632 which surrounds a passage 633. This passage 633 allows access for an electrical connector plug 624 of the weighing cell 602. The connector plug 624 serves to establish an electrical connection to a connector socket 631 arranged on a base plate 608 which in this illustration is arranged below the fastening plate 634, spaced apart from the latter. The electrical connection here has the form of a connector plug 624, but it is also possible to configure the connection as a simple cable with an appropriate connection. The base plate 608 and the fastening plate 634 are connected to each other by spacer columns 635. The border area of the recess 632 which surrounds the passage 633 serves as a seat for the structure that carries the plug 624, which includes in particular a printed circuit board. In this illustration, the spreader pins 615 and the guide bolts 617 are connected directly to the fastening plate 634.

It would likewise be conceivable to configure the fastener device 613 as an element which would be set onto and/or into a base plate.

Care should be taken when establishing the mechanical and electrical connection of the weighing cell 602 to the receiving structure that the system does not become over-determined. The problem is solved with a concept where the connector socket 631 is mounted in the base plate 608 with a floating play in the range of tenths of millimeters.

Figure 7:
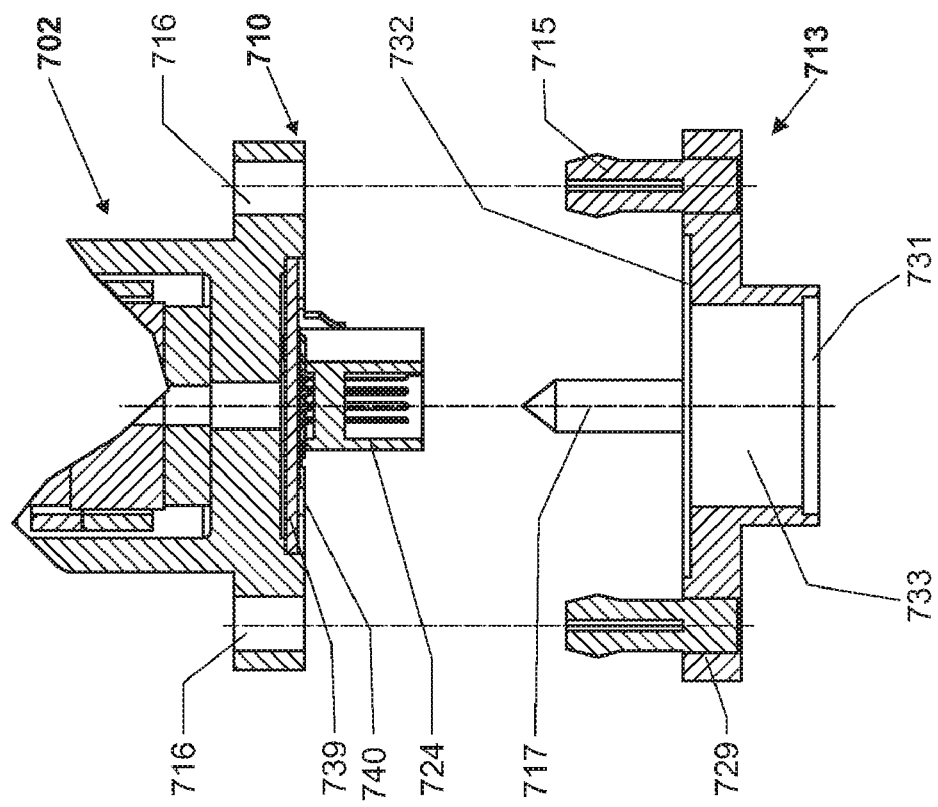
FIG. 7 represents a side view of a detail of a weighing cell in the area of the fastener devices.

A further embodiment of fastener devices is shown in a sectional view in FIG. 7. The first fastener device 710 is largely analogous to the one shown in FIG. 6. The structure carrying the connector plug 724 is recognizable in FIG. 7 as a printed circuit board 739. On this circuit board 739, there can be a memory chip 740 arranged on which specific data of the weighing cell 702 are stored. These data include for example the identification of the weighing cell or temperature compensation data or similar information. When a weighing cell is newly installed in the receiving structure, and immediately after contact has been established through the plug connection, the weighing cell is interrogated regarding its identity by a processor unit (not shown in the drawings) and the correction data for the weighing cell are transferred to the processor unit.

The second fastener device 713 consists of a socket 729 to which two spreader pins 715 as well as two guide bolts 717 are fastened. The spreader pins 715 and the guide bolts 717 are mounted, respectively, on diagonally opposite corners of the socket 729. The socket 729 further has a recess 732 which surrounds a passage 733. The recess 732 again serves to receive the structure 739 on which the electrical connector 724 of the weighing cell is arranged. The opening of the passage 733 that faces away from the weighing cell 702 is delimited by a further structure in which the connector socket 731 for the electrical connector plug 724 of the weighing cell 702 is located.

In some of the illustrated variants, the weighing cells are equipped with a plug which at the time of installation of a weighing cell into the weighing device is brought into contact with a matching connector socket. This separation is very advantageous, as the electrical connections are thus routed through a base plate, for example, as shown in FIGS. 5 to 7, in a recess of the base plate or the socket that is connected to the latter. This has the advantage that the base plate, being preferably made of metal, screens the connecting leads against electromagnetic interference. In addition, this concept allows mechanical stresses on the electrical leads to be avoided.

Besides the design configurations of the weighing cell as described and illustrated, it is also possible for the weighing cell to be equipped with an auxiliary device. Such an auxiliary device can for example be a grip hold on the outside of the weighing cell, which facilitates the removal of individual weighing cells from the receiving structure either manually and/or with a suitable tool.

The weighing cell can further be equipped with a marking and/or a safeguard against installing it the wrong way, for example by simple color markings, pins cooperating with grooves or holes, etc.

It is also conceivable to provide the weighing cell with a unique identifier code, be this in the form of a bar code, a matrix code, or as a passive element of an RFID-code setup. A corresponding counterpart is arranged for example at the receiving structure. Thus it is possible for example to realize a safety switch arrangement which would allow a weighing process to take place only after the required weighing cells are placed correctly in the receiving structure. However, identification data and further data could also be stored in the memory chip 740 which has been mentioned in context with the description of FIG. 7.

The weighing device according to the invention has been described and illustrated in a preferred embodiment. However, based on the teachings of the invention, other variants can also be realized within the scope of the pertinent art.

What is claimed is:

1. A weighing device, comprising:
a weighing cell, defining a load direction and comprising a first fastener device;
a structure for receiving the weighing cell, comprising a second fastener device that is a complementary counterpart of the first fastener device; a detent engagement mechanism formed by the combination of the fastener devices, such that the fastener devices hold and release the weighing cell through a form-locking engagement which can be locked and released, respectively, by a force pushing in the load direction and pulling against the load direction.

2. The device of claim 1, wherein:
the receiving structure receives a plurality of the weighing cells, and the plurality of the weighing cells is arranged in the receiving structure in a design space whose dimension in a plane orthogonal to the load direction matches the largest dimension that the weighing cell has in the same plane, the dimension being delimited by the design spaces reserved for neighboring weighing cells that are to be arranged in the receiving structure.

3. The device according to claim 2, wherein:
the receiving structure accommodates the plurality of the weighing cells in a two-dimensional area or matrix structure.

4. The device of claim 2, wherein: the receiving structure is configured to hold the weighing cells on a plurality of planes.

5. The device according to claim 1, wherein:
the receiving structure comprises a base plate with the second fastener device arranged therein, and
the weighing cell has an underside, the first fastener device arranged thereat.

6. The device of claim 1, wherein: the receiving structure comprises a fastening plate on which the weighing cell can be installed, and the second fastener device is incorporated in the fastening plate.

7. The device of claim 1, wherein: the fastener devices in cooperation with each other establish at least one of a mechanical and an electrical connection between the at least one weighing cell and the receiving structure.

8. The device of claim 1, wherein: the weighing cell comprises a housing, with the first fastener device arranged thereon.

9. The device of claim 1, wherein: at least one of the first and the second fastener devices comprises a guide feature.

10. The device of claim 9, wherein: the first fastener device comprises a groove or recess and the second fastener device comprises at least two balls, each of which is seated on a spring element, wherein at the moment of setting the weighing cell into the receiving structure, the balls snap into the groove or recess.

11. The device of claim 9, wherein: the first fastener device comprises at least two holes and the second fastener device comprises at least two spreader pins, wherein when the weighing cell is set into the receiving structure, the spreader pins snap into engagement with the holes.

12. The device of claim 7, wherein: the mechanical connection and the electrical connection are spatially separated from each other in the receiving structure.

13. The device of claim 1, wherein: each weighing cell comprises a unique identification code, and
the receiving structure comprises a suitable counterpart for detecting the code.

14. The device of claim 1, wherein: each weighing cell comprises a memory chip for storing compensation data and other data specific to the weighing cell.

15. The device of claim 1, wherein: each weighing cell has a single load receiver.

16. The device of claim 3, wherein:
the receiving structure is configured to hold the weighing cells on a plurality of planes.

* * * * *